April 18, 1961 I. M. WHITE 2,980,388
BUTTERFLY VALVE
Filed April 15, 1955 3 Sheets-Sheet 1
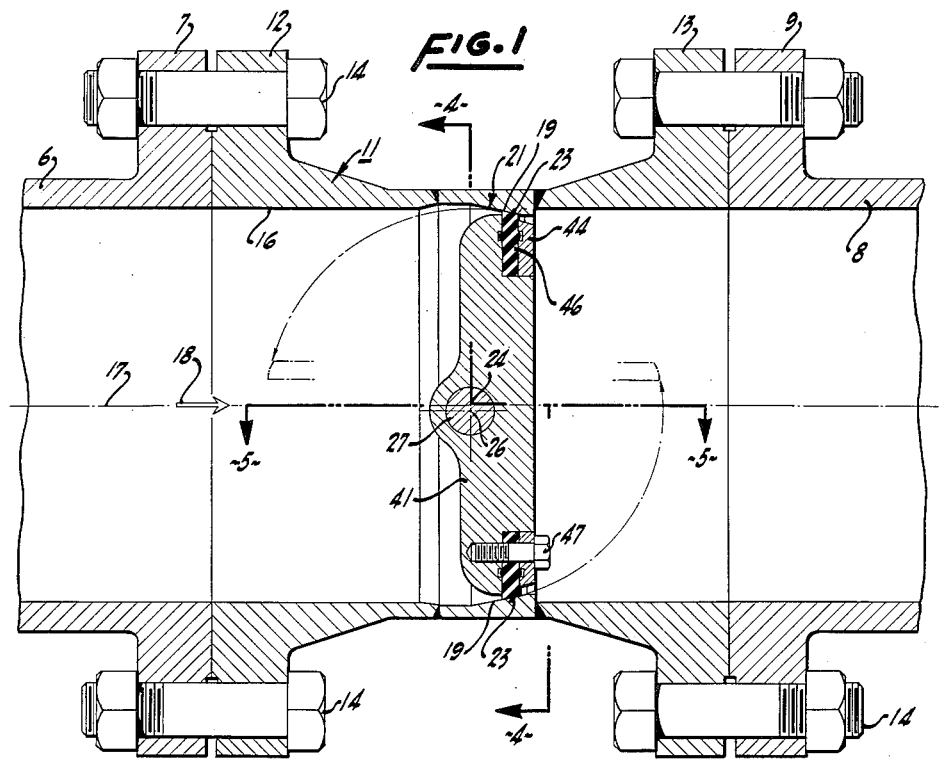
FIG. 1
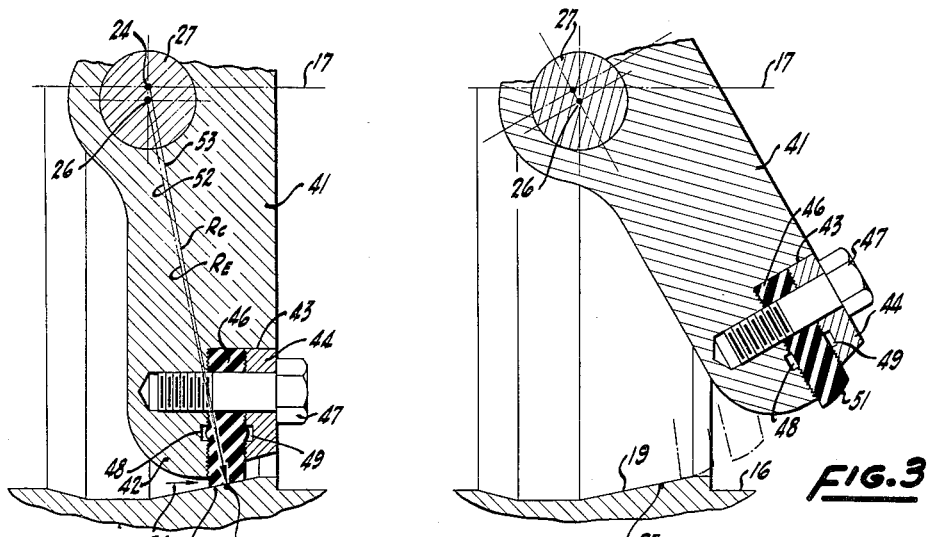
FIG. 2
FIG. 3
INVENTOR.
IRA MORGAN WHITE
BY
ATTORNEY

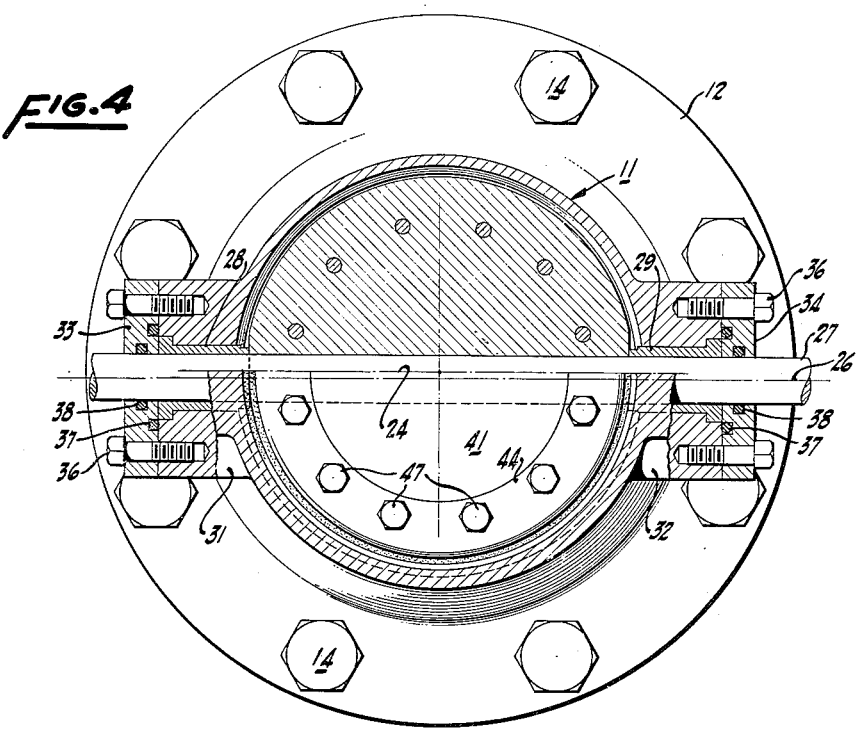
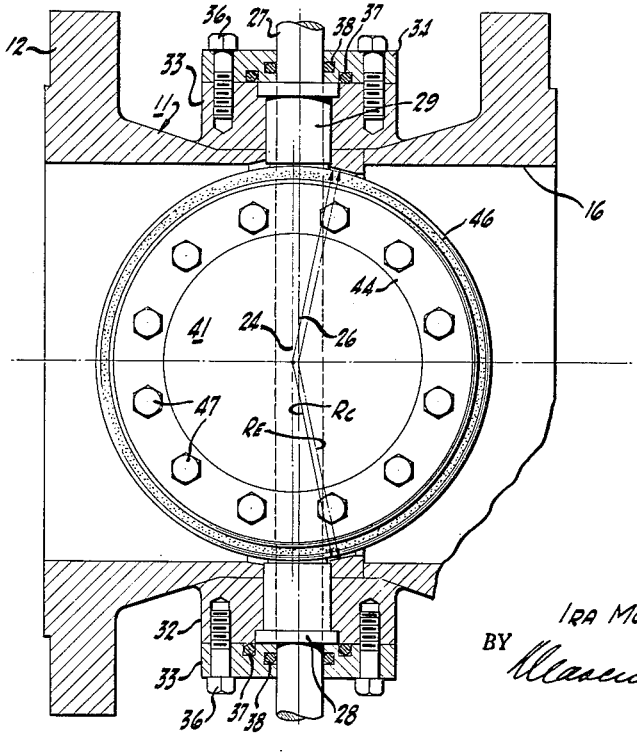

April 18, 1961     I. M. WHITE     2,980,388
BUTTERFLY VALVE
Filed April 15, 1955     3 Sheets-Sheet 3
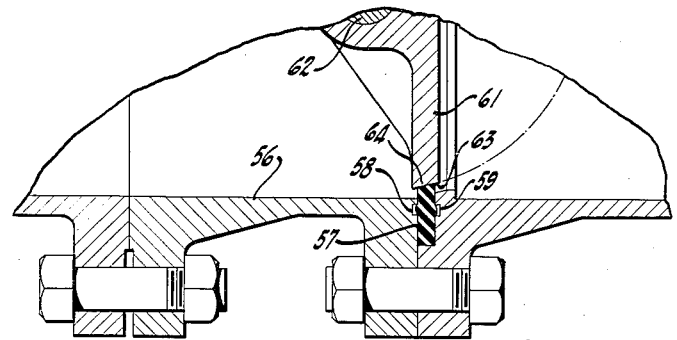
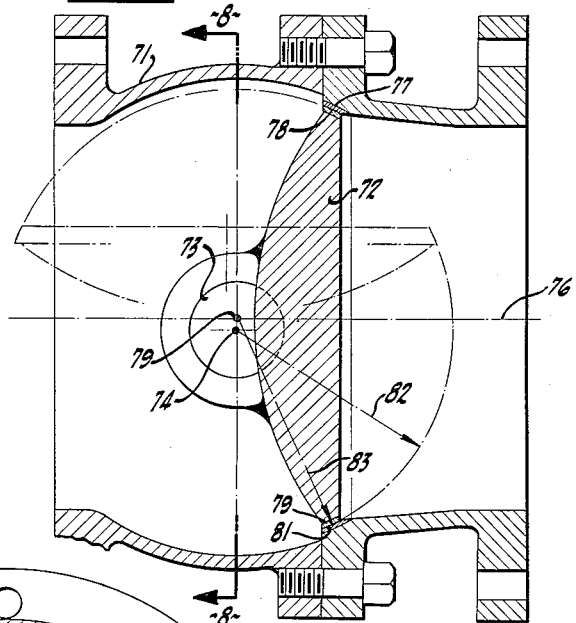
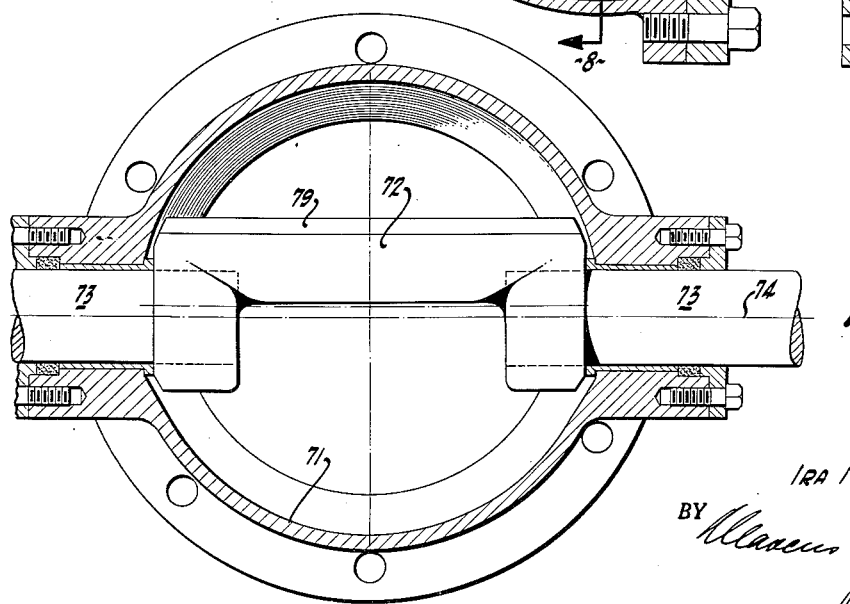
INVENTOR.
IRA MORGAN WHITE
BY
ATTORNEY United States Patent Office 2,980,388
Patented Apr. 18, 1961

2,980,388

BUTTERFLY VALVE

Ira Morgan White, Berkeley, Calif., assignor, by mesne assignments, to Baldwin-Lima-Hamilton Corporation, Philadelphia, Pa., a corporation of Pennsylvania Filed Apr. 15, 1955, Ser. No. 501,557

5 Claims. (Cl. 251—175)

My invention relates to a mechanical valve for controlling the flow through a conduit and is particularly concerned with a valve somewhat like the spherical valve shown in Bacchi Patent 2,663,538 assigned to the assignee of the present application, but designed for cheaper fabrication, for easy installation in and removal from the conduit, for ready servicing, for moderate flow disturbance when open and for tight construction when closed.

In the provision of valves for controlling flow through pipelines, particularly hydraulic pipe lines, it is desirable that the valve not only be tight when closed but that it creats little disturbance to the fluid flow when open and that it requires only a small amount of effort for moving it between open and closed positions. It is also desirable, since valves tend to become elaborate in design and heavy in construction and to require a great deal of fine machining in order to meet these requirements, to provide a reliable valve, the nature of which is simpler and less elaborate so that the sealing function can be well performed, so that the operating function can be well performed and so that the flow interruption will not be great when the valve is open and yet which can be readily and simply made and, consequently, sold at a relatively small price. A butterfly valve lends itself to most of these objectives since it is relatively simple from the mechanical aspect and can be substantially balanced in its operation and, if reasonably well designed, does not cause any substantial disturbance to flow when it is open. It is very difficult to make a butterfly valve adequately tight. Sometimes the sealing arrangements adopted are fully as expensive and elaborate as those of different types of valves so that the apparently attractive features of the butterfly valve are not attained readily in practice.

It is an object of my invention to provide a butterfly valve which is of simple and economical construction and which has an adequate and tight seal when it is closed.

Another object of the invention is to provide a butterfly valve which seals tightly when it is in its closed position, yet which can be opened readily to provide substantially undisturbed flow.

Another object of my invention is to provide a butterfly valve in which the load due to sealing is substantially counter-balanced in the valve itself, so that closing and opening and position control are readily effectuated.

Another object of my invention is to provide a butterfly valve in which the valve itself introduces only a small disturbance in the flowing stream.

Another object of my invention is to provide a butterfly valve which not only has a simple and adequate sealing mechanism but in which the sealing mechanism can be changed readily if that is necessary.

A still further object of my invention is, in general, to provide an improved butterfly valve.

Other objects, together with the foregoing, are attained in the embodiments of the invention, described in the accompanying description and illustrated in the accompanying drawings, in which Figure 1 is a cross section on a longitudinal axial plane through a conduit in which one form of butterfly valve, in accordance with my invention, is incorporated, the valve being in closed position.

Figure 2 is a view of a portion of the valve disc and associated parts, comparable to the showing in Figure 1, but to a substantially enlarged scale.

Figure 3 is a view comparable to Figure 2 but showing the valve disc in partly open position.

Figure 4 is a cross section, the plane of which is indicated by the lines 4—4 of Figure 1.

Figure 5 is a cross section, the plane of which is indicated by the line 5—5 of Figure 1.

Figure 6 is a view similar to Figure 1 and shows a modified form of butterfly valve.

Figure 7 is a cross section on a longitudinal axial plane through a conduit in which another form of butterfly valve in accordance with my invention is incorporated, the valve being shown in full lines in closed position and partly in broken lines in open position.

Figure 8 is a cross section, the plane of which is indicated by the line 8—8 of Figure 7 and showing the valve in open position.

In my embodiment, as shown in Figures 1-5, my butterfly valve is included in a pipe line 6 having an upstream flange 7 and continued in a downstream portion 8 having a downstream flange 9. Interposed in the line is a conduit 11 having a mating upstream flange 12 and a mating downstream flange 13. The various flanges are appropriately secured together in the customary way by fastenings 14. The conduit 11, on its interior, is, for the most part, defined by a substantially circular cylindrical wall surface 16 symmetrical or substantially so about a longitudinal or through axis 17 sometimes referred to as a flow axis. Flow can be in either direction along the axis 17 but usually is, and for descriptive purposes is assumed to be, in the direction indicated by the arrow 18. Within the conduit 11 and extending inwardly from the wall 16 at a convenient point is an annular seat 19 which has a larger upstream diameter or periphery than it does a downstream periphery and is conveniently of the shape of a surface 21 of revolution, preferably a cone. That is to say, the larger diameter of the seat 19 is upstream and the diameter of the seat decreases gradually in a downstream direction.

Since the seat is relatively narrow and since the inclination of its conical surface is not very great, it can in practice be a spherical surface. Preferably, however, the seat surface is made conical or tapered since that is somewhat less expensive and, in practice, with the valve sealing ring to be described, serves very well.

If the conical surface 21 were extended, its apex would be disposed on the through or flow axis 17. A transverse plane perpendicular to the through axis 17 intersecting the central portion of the conical surface 21 affords a circular trace indicated by the dot 23. Also, if a normal cone were erected with its elements at right angles to the surface 21 and all extending from the circular trace 23, the apex of the normal cone would lie at a point 24 directly on the through axis 17 and to one side of, or on the upstream side of, the conical seat 19.

Pursuant to the invention, there is established a rotational axis 26 preferably in the same transverse plane which contains the apex 24 and is normal to the through axis 17. The rotational axis 26 does not intersect the through axis 17 nor pass through the apex 24 but preferably is spaced or separated from such axis 24 by an appreciable amount. In other words, the axis 26 is displaced or disposed laterally with respect to the flow axis 17.

Designed to revolve about the rotational axis 26 is a cross shaft 27 laterally displaced or disposed with respect to the flow axis 17, extending transevrsely through the conduit 11 and emerging on one or both sides thereof. As illustrated in Figure 4, the shaft 27 emerges on both sides of the conduit, although if desired, one end of the shaft can be kept within the conduit. Preferably, the shaft 27 is suitably mounted in bushings 28 and 29 held in bosses 31 and 32 forming part of the conduit 11. Caps 33 and 34 are held in position by appropriate fastenings 36 while packing rings 37 and 38 preclude substantial leakage. When an appropriate torquing device is applied to the shaft 27, the shaft is rotated about the axis 26 within the bushings 28 and 29.

Disposed on and fixed to the cross shaft 27 is a valve disc 41 which is partly offset but most of which is substantially symmetrical about the axis 17. The disc 41 is of less diameter than the smaller diameter of the valve seat 19 and around its periphery is provided with a flange 42 forming a shoulder 43 on which a detachable rim 44 is movable. Between the flange and the rim there is provided a space for the reception of a sealing ring 46. The sealing ring is conveniently fabricated in flat annular form from rubber or synthetic material or an elastomer or other rubber-like material having the capability of withstanding the fluid flowing through the conduit 11 and also of temporarily deforming slightly under load. The outer diameter of the ring 46 is less than the large diameter of the valve seat 19 and is more than the small diameter of the valve seat 19.

Preferably, the sealing ring 46 is pierced, as is the rim 44, to receive appropriate fastenings 47 engaged with the disc 41 so that upon drawing up the fastenings, the sealing ring is in a small degree deformed. Partly, such deformation increases the diameter of the continuous circular ring 46 and partly the deformation extrudes slightly into an annular groove 48 cut into the flange 42 and into an annular groove 49 cut into the rim 44. The grooves 48 and 49 provide extra volumes to receive displaced portions of the ring 46, the amount of displacement depending upon the load.

The outer surface 51 of the sealing ring when free, as especially shown in Figure 3, is preferably of a special, substantially rounded contour. This is not necessarily a mathematically exact curved or spherical surface and in some instances is substantially conical. The rounded contour of the surface 51 when free is deformed into the shape of the abutting surface 21 when seated. The shape of the sealing ring 46 approximates or reproduces the conical surface 21 when the ring is seated. As shown in Figure 2, the bottom point (and other points) of the stationary circular trace 23 on the seat 19 is at a distance Rc or "radius" 53 from the apex 24. The motion path of the adjacent bottom point on the sealing ring 46 is on a different radius 52 at a distance Re from the rotational axis 26. Other ring points have comparable relationships to their adjacent seat points. Because of the deformation and the relationship of the apex 24 and axis 26, the ring 46 and the surface 21 conform when the valve is closed (Figure 2). In a partly open position of the valve, the surface 51 takes on its free contour. As the valve opens, the ring 46 and the surface 21 move apart and the apex 24 shifts around the axis 26 as shown in Figures 2 and 3.

When the valve disc is swung from its open position (Figure 5) through the partially closed position (Figure 3) and into the closed position (Figures 1 and 2) the surface 51 in rotating about the axis 26 approaches closely to the conical surface 21 until in its seated position the sealing ring 46 is substantially co-extensive and symmetrical with the trace 23. In this closed position, the ring 46 is under load and is displaced into very firm engagement and exact correspondence with the contour of the conical surface 21. To accommodate the necessary deformation of the ring 46, some of the rubber-like material is displaced and extrudes even more into the grooves 48 and 49 which are made adequate for that purpose.

Also it will be observed, expecially as indicated by the arrow 54 in Figure 2, that upstream pressure, of water for example, acts on an exposed annular portion of the sealing ring 26 and causes further axial displacement of the ring against the downstream converging conical surface 21 so that the rubber-like sealing ring is forced with a radial component against the conical seat. In this position, the valve is continuously and completely sealed around the entire circular periphery of the sealing ring. Valves of the sort shown are drop tight even under substantial hydraulic pressures and after thousands of operations.

When the valve is to be opened, the shaft 27 is rotated from its Figure 2 position through its Figure 3 position and into its position shown in Figure 5. Since the axis of rotation 26 is displaced from the apex 24 which is the convergence of conical elements normal to the effective conical surface 21, and since the bottom radius 52 is slightly shorter than the corresponding one of the conical elements 53 between the apex 24 and the conical surface 21, the rubber-like sealing ring, in effect, lifts from the conical seat as the valve is opened.

Thus, the valve opens very easily, the opening being slightly resisted by the closing moment due to the eccentric mounting of the valve disc but the size of the closing moment is substantially less than the normal friction in the bushings 28 and 29, so that little more than the force necessary to open a balanced valve needs to be exercised to crack and open the present valve. When the valve disc is in its fully open position, as shown in Figure 5, it presents to the flowing stream some unbalanced surfaces resulting in a force tendency to close the valve. The amount of this unbalance, however, is relatively small so that while an assist is given the initial closing movement of the valve, there is not normally enough force available to cause the valve to close of its own accord or to slam, although by increasing the unbalance, the valve can be made to act as a check valve.

With the valve constructed as described, the machining and fabricating operations are relatively simple since the conical seat 21 need not be precisely machined as the rubber-like sealing ring has some substantial accommodation to irregularities. Furthermore, if the flanges 13 and 9 can readily be separated, it is a simple matter after removal of the fastenings 47 to withdraw the rim 44 and the sealing ring 46 and to introduce a new sealing ring should scuffing or wear or permanent distortion of the ring occur.

In some instances it is preferred to reverse the relative positions of the metal surface 21 and the rubber-like surface 51 and so a construction as shown in Figure 6 results. Here the conduit 56 is made in sundry detachable parts with a deformable, rubber-like ring 57 clamped in place between them. Extrusion grooves 58 and 59 are provided as before. A valve disc 61 on a shaft 62 has a surface 63 meeting the surface 64 of the ring 57 when the valve is in closed position, the geometry being virtually as described in connection with Figures 1–5.

When fine machinging is not prohibitively expensive and when rubber-like materials are not desired, the valve can take a form as shown in Figures 7 and 8 wherein the structure is much as before. In a separable conduit 71 a valve disc 72 is mounted on a cross shaft 73 having its rotational axis 74 displaced from the longitudinal axis 76 of the conduit, the geometry being substntnially as previously described. The conduit 71 has a seat 77, usually of metal, with a spherical surface 78 generated about a point 79 or apex on the axis 76 and contained in a normal plane also containing the axis 74. A mating seat 79, also usually of metal, has a similar spherical surface 81 generated about the point 79. Since the disc 72 revolves about the axis 74, the radius 82 of the surface of revolution generated by the moving disc is slightly shorter than the radius 83 of the curvature of the spherical surfaces 78 and 81. The functioning of this valve is substantially as previously described except that there is no substantial deformation of the seats 77 and 79, close machining being relied upon to produce a drop tight closure within the deformation limits of the metal customarily used.

In general, therefore, there is provided a butterfly valve readily manufactured at an economical price, effective to stop flow absolutely in its closed position, effective to provide little disturbance to the stream when the valve is opened and readily maneuvered from open to closed position and into and out of intermediate positions without substantial force.

What is claimed is:

1. A butterfly valve comprising a circular cylindrical conduit having a flow axis, a rotatable shaft extending across said conduit and disposed laterally with respect to said flow axis, a continuous conical seat extending around the interior periphery of said conduit on one side of said shaft, said conical seat having its larger diameter near said shaft and its smaller diameter away from said shaft, a valve disc mounted on and rotatable with said shaft into and out of closed position, said disc having a diameter less than said smaller diameter of said conical seat whereby said disc in all positions thereof is spaced from said seat, and a rubber-like continuous sealing ring mounted on and extending freely in a radially outward direction all around the periphery of said disc in a position to engage said seat when said valve disc is in said closed position, the free diameter of said ring being greater than the smaller diameter of said seat and smaller than the larger diameter of said seat.

2. A butterfly valve comprising a conduit substantially symmetrical about a flow axis, a conical seat in said conduit and tapering from a larger diameter to a smaller diameter, the axis of the seat cone being coincident with said flow axis so that a plane normal to said flow axis cuts said seat in a circular trace, a valve disc within said conduit and of smaller diameter than said smaller diameter portion of said seat whereby said disc is spaced from said seat, means mounting said disc for rotation in said conduit about a disc axis extending across said conduit and disposed laterally with respect to said flow axis and disposed on the side of said seat away from the apex of said seat cone, whereby said disc is subjected to an unbalanced pressure load, and a rubber-like sealing ring on said disc around the periphery thereof, said sealing ring having a diameter smaller than the larger diameter of said seat and having a diameter larger than the smaller diameter of said seat and in the closed position of said valve substantially conforming to said circular trace in abutment with said seat whereby said ring is the sole means for transmitting said load from said disc to said seat.

3. A butterfly valve comprising a circular cylindrical conduit symmetrical about a flow axis and having a downstream converging conical seat therein, said seat having a relatively large upstream diameter and a relatively small downstream diameter, a rotatable cross shaft spanning said conduit upstream of said seat and disposed laterally with respect to said flow axis, a valve disc secured to said shaft for rotation therewith, said valve disc being smaller in diameter than said downstream diameter of said seat, a rubber-like continuous sealing ring having a free diameter of a dimension between that of the larger diameter and the smaller diameter of said seat, and means for mounting said ring on said disc concentrically with said conduit and in the closed position of said valve with said ring on the upstream side of and substantially abutting said conical seat.

4. A butterfly valve comprising a circular cylindrical conduit having a flow axis, a shaft extending across said conduit and disposed laterally with respect to said flow axis, means for mounting said shaft for rotation in said conduit, a valve disc of a predetermined diameter mounted on said shaft for rotation therewith, a rubber like sealing ring of a diameter when free larger than said predetermined diameter, means for situating said ring on said disc to one side of said shaft and in one position of said disc with said ring disposed in a plane normal to the flow axis of said conduit, and a seat extending inwardly from the wall of said conduit to engage said ring in said position of said disc, the surface of said seat converging in a direction away from said shaft, the smallest diameter of said seat surface being greater than that of said disc and smaller than that of said ring while the largest diameter of said seat surface is larger than that of said ring.

5. A butterfly valve comprising a circular cylindrical conduit having a flow axis, a shaft extending across said conduit and disposed laterally with respect to said flow axis, means for mounting said shaft for rotation in said conduit, a continuous circular sealing ring of resilient material disposed with the plane thereof parallel to but displaced from said shaft, a valve disc mounted on said shaft and serving as a mounting for said sealing ring, and a tapered seat on the inside wall of said conduit adapted to be engaged solely by said ring when said disc is in closed position, the periphery of said seat being larger near said shaft than the periphery of said seat farther away said shaft, both of said peripheries being larger than that of said valve disc and said larger seat periphery being larger than said ring while said smaller seat periphery is smaller than said ring.

References Cited in the file of this patent

UNITED STATES PATENTS

| 192,633 | Bean | July 3, 1877 |
| 1,588,445 | Chandler | June 15, 1926 |
| 2,107,200 | Kennon | Feb. 1, 1938 |
| 2,260,381 | Kennon | Oct. 28, 1941 |
| 2,586,927 | Fantz | Feb. 26, 1952 |
| 2,657,896 | Muller | Nov. 3, 1953 |

FOREIGN PATENTS

| 302,526 | Great Britain | of 1928 |